United States Patent
Algüera et al.

(10) Patent No.: US 8,348,298 B2
(45) Date of Patent: Jan. 8, 2013

(54) SLIDER WITH HYDRAULIC CYLINDER

(75) Inventors: José Manuel Algüera, Aschaffenburg (DE); Martin Richter, Frankfurt am Main (DE)

(73) Assignee: Jost-Werke GmbH, Neu-Isenburg (DE)

( * ) Notice: Subject to any disclaimer, the term of this patent is extended or adjusted under 35 U.S.C. 154(b) by 466 days.

(21) Appl. No.: 12/086,672

(22) PCT Filed: Dec. 18, 2006

(86) PCT No.: PCT/EP2006/069834
§ 371 (c)(1),
(2), (4) Date: Nov. 28, 2008

(87) PCT Pub. No.: WO2007/068762
PCT Pub. Date: Jun. 21, 2007

(65) Prior Publication Data
US 2009/0072515 A1 Mar. 19, 2009

(30) Foreign Application Priority Data
Dec. 16, 2005 (DE) .................. 10 2005 060 124

(51) Int. Cl.
*B62D 53/08* (2006.01)

(52) U.S. Cl. ............... 280/441.1; 280/441; 280/433

(58) Field of Classification Search .............. 280/441, 280/441.1, 433
See application file for complete search history.

(56) References Cited

U.S. PATENT DOCUMENTS

| | | | | |
|---|---|---|---|---|
| 3,768,372 A | * | 10/1973 | McMillen | 91/516 |
| 4,429,892 A | * | 2/1984 | Frampton et al. | 280/407 |
| 5,101,630 A | * | 4/1992 | Wagenseil | 60/460 |
| 5,226,675 A | * | 7/1993 | Noah et al. | 280/439 |
| 5,344,173 A | * | 9/1994 | Beeler et al. | 280/438.1 |
| 6,746,035 B1 | * | 6/2004 | Williams et al. | 280/432 |
| 7,207,587 B1 | * | 4/2007 | Wall | 280/425.2 |
| 2004/0074702 A1 | * | 4/2004 | Moser et al. | 187/275 |
| 2007/0204608 A1 | * | 9/2007 | Von Baumen et al. | 60/476 |
| 2008/0036173 A1 | | 2/2008 | Alguera | |

FOREIGN PATENT DOCUMENTS

| | | |
|---|---|---|
| DE | 1780 488 | 1/1972 |
| DE | 43 24 289 A1 | 1/1995 |
| DE | 199 44 684 C1 | 11/2000 |
| DE | 10 2004 045 662 | 9/2004 |
| EP | 0264321 | 4/1988 |
| EP | 0 503 954 A1 | 9/1992 |
| FR | 2 625 472 A1 | 7/1989 |
| WO | WO 99/24312 | 5/1999 |
| WO | WO 02/070328 A1 | 9/2002 |

* cited by examiner

Primary Examiner — Tony H. Winner
Assistant Examiner — Jacob Knutson
(74) Attorney, Agent, or Firm — Hudak, Shunk & Farine Co., LPA

(57) ABSTRACT

A slider for a fifth wheel is arranged on a towing vehicle, comprising a substructure with at least two guide rails aligned in the direction of travel, a displaceable slide carrying the fifth wheel and acting upon the guide rails, and a motor-driven drive unit. A slider is provided which allows the gap width between the towing vehicle and the trailer being adapted to the respective driving situation during travel. For this purpose, the slider is characterized in that the motor-driven drive unit is configured from a hydraulic cylinder connected to a hydraulic circuit.

40 Claims, 4 Drawing Sheets

SLIDER WITH HYDRAULIC CYLINDER

FIELD OF INVENTION

The invention concerns a slider for a fifth wheel arranged on a tractor vehicle, comprising a substructure with at least two guide rails oriented in the direction of travel, a displaceable slide which carries the fifth wheel and engages with the guide rails, and a motor-driven drive unit.

BACKGROUND OF THE INVENTION

Sliders are known, for example, from DE-AS 17 80 488, EP 0 503 954 A1, or DE 199 44 684 C1.

Moreover, a slider is known from WO 02/070328 A1, which has two guide rails with toothed strips, on which a slide is mounted and able to move, which carries a fifth wheel. A locking mechanism with clamping shoes, engaging with toothed strips, is arranged on the slide.

The sliders which have become known thus far are designed to make an adjustment in regard to the distance between tractor and trailer before the drive begins. However, it has been found that the gap or intermediate space arising between the front of the trailer and the cabin of the tractor results in aerodynamic vortices during the drive, which influence the air drag and thus the fuel consumption of the rig.

In order to counteract this effect, wind deflectors are often mounted on the cabin of the tractor, in order to guide the air deliberately across the gap. Furthermore, it is quite sensible to make the gap or intermediate space as small as possible. On the other hand, a gap adjusted to be too small will result, on curves or due to interactions of the payload when braking the rig, to the front of the trailer or its edges knocking against the driver's cabin.

Situations can also occur in which it is advisable to allow a large gap, for example, in order to make room for equipment or to improve access to the utility lines and their connections when the vehicle is parked.

With the known sliders, although a changing of the gap between tractor and trailer is possible, still the driver must open the mechanics of the slider, then change the size of the gap by moving the tractor, lock the mechanics once more and make sure of its properly locked status. The movement of the fifth wheel and thus the trailer relative to the tractor can also be assisted by means of a motor-operated drive unit. This process requires some skill and can result in serious bodily strain for the drivers. Furthermore, this is only possible when the vehicle is parked, never during the drive.

SUMMARY OF THE INVENTION

Therefore, the problem of the invention is to provide a slider with which a gap dimension between tractor and trailer adapted to the particular driving situation can be produced during the drive.

The problem is solved according to the invention with a slider in which the motor-driven drive unit is formed from a hydraulic cylinder connected to a hydraulic circuit.

Thanks to the motor-operated drive unit, it becomes possible to change the position of the fifth wheel by means of the hydraulic cylinder even during the drive in a feedback control operation. The dimension of the gap, i.e., the size of the intermediate space between the driver's cabin and the trailer, can be adapted individually in dependence on the driving situation, so that the distance during slow driving, for example, when switching payloads, or when parked, can be selected to be large, and when driving fast on the freeway it can be small. The vortices between tractor and trailer can thus be substantially reduced, especially when driving fast. The travel path of the slide or the fifth wheel placed stationary thereon is preferably between 150 mm and 300 mm, especially preferably 200 mm, or optionally 250 mm.

The major benefit of the invention lies in that the adjustment can occur quickly, especially when the driver reacts very late. This is the case, for example, when the driver is traveling on a curve at too high speed and breaks heavily only at the last instant. Other scenarios of a so-called panic braking are a sudden full braking or sharp avoidance maneuver of the road train. In order to avoid the trailer bumping against the tractor, the gap between tractor and trailer must be increased as fast as possible to a sufficiently large amount by applying pressure to the hydraulic cylinder. The speed of adjustment of the slide should be at least 20 mm/s or even better 30 mm/s.

The hydraulic cylinder should be designed with its own hydraulic circuit for this, which is coordinated in terms of its dimensions to the hydraulic cylinder and which provides an adequate operating pressure for a panic braking in a time under 1 second in every driving situation. Consequently, the hydraulic circuit should also have its own hydraulic pump, which preferably has a desired electrical power consumption of under 1000 Watt. The delivery volume flow can be between 8 l/min and 12 l/min, especially preferably 10 l/min. The types of pumps which can be used are vane-cell pumps, external gear pumps or axial piston pumps.

Preferably, the hydraulic cylinder engages by a first end with the slide and can be placed by its other end on a stationary component of the tractor vehicle. The hydraulic cylinder should engage with the slide from the cabin side, i.e., from the front, so that the entry zone of the fifth wheel remains free and the hydraulic cylinder is not damaged by the trailer in the coupling process.

It has proven to be favorable for the stationary component to be formed by the substructure. The substructure in addition to the guide rails can be provided with cross beams at its end, for reinforcement. This allows for a modular construction and can furthermore be used as an abutment for the other end of the hydraulic cylinder.

Preferably, the hydraulic cylinder is of dual-acting type, so that a single cylinder can be used both for the forward movement and the backward movement of the slide.

In a special embodiment, the dual-acting hydraulic cylinder is a constant running cylinder and/or a differential cylinder. In a constant running cylinder, the same amount is expelled from the cylinder and fed back in on the other side.

This is especially favorable when no intermediate or equalizing tank is present.

Preferably, the hydraulic circuit includes a control valve, which controls the travel of the hydraulic cylinder. This control valve can be connected to an electronic control device and receive from it a signal for the travel of the slide. The control device controls the control valve both when moving the slide in feedback control operation and during a sudden panic braking.

In order to recognize a panic braking in good time, the control device can be connected to a vehicle control device. In this way, information as to the speed of travel can be called up, thus adjusting the gap between tractor and trailer in feedback control mode. Modern tractors are usually outfitted with a brake assist, which regulates the rate of deceleration based on parameters intrinsic to the vehicle. The signals generated in this way are especially suitable as input signal for the control device, so as to identify a panic braking and trigger an extremely fast backward movement of the slide to enlarge the size of the gap.

Preferably, the slide is positively fixed to the guide rails in a near steady operating condition by means of clamping shoes arranged on it, and the fixation is released only during the movement of the slide. This yields the advantage that, once the prescribed distance between tractor and trailer has been adjusted during the ride, the hydraulic cylinder is not exposed to the large forces arising in the feedback control mode. Furthermore, a counterpressure acts on the hydraulic circuit, so that a spring effect is reduced and the hydraulic system is approximately rigid and ready with high pressure. In event of a panic braking, the reaction time of the hydraulic system is further decreased in this way.

To operate the clamping shoes, an actuating element can be arranged on the slide, which moves the clamping shoes into a released position and a locking position, a pneumatic cylinder being especially suitable as the actuating element for this.

Advantageously, the pneumatic cylinder can be connected to a pressurized air supply of the tractor vehicle. The filling of the pneumatic cylinder should take place via electromagnetic valves. The electromagnetic valves are preferably connected to the control device, so that the moving of the clamping shoes into the released or locking position is logically coupled to the displacement function of the hydraulic cylinder.

This design configuration enables very fast reaction times in event of a panic braking and, what is more, it is easy to install, since a pressurized air supply is present in any case on the tractor vehicle and an open pneumatic circuit can be selected.

In a first embodiment, the hydraulic circuit is also constructed as an open circuit.

A pressure storage device, especially preferably a bladder accumulator, should be arranged between the pump and the control valve. Even though fast-acting pumps are already available on the market, the reaction time of the overall slider can be still further reduced substantially by installing a pressure storage device, which is of great importance especially in the case of a panic braking.

A 4/3-way valve is especially suitable as the control valve.

Preferably, a pressure switch is arranged between the pump and the control valve. The pressure switch puts out an electrical signal, which is triggered at a preselected pressure. One can use pistons, membranes and corrugated tubes as the pressure transmitting element for the pressure switch. By means of the pressure switch, there is generally accomplished a sending of control and feedback signals to the hydraulic circuit, the reporting of certain pressure values, to the control device for example, and an automatic pressure limiting. This is achieved in particular if the pressure switch controls the operation of the pump. This can be accomplished by a control line directly from the pressure switch to the pump or indirectly via a control line to the control device and from here to the pump.

In the embodiment with an open hydraulic circuit, a 2/2-way valve with check valve should be arranged downstream from the control valve between a feed and drain line of the hydraulic cylinder. This arrangement enables a failsafe function, whereby in event of a system failure the hydraulic cylinder can only be extended by external forces, thus adjusting a larger gap between tractor vehicle and trailer. The functioning of the clamping shoes or their actuating element is also included in the failsafe function, if desired.

In a second alternative embodiment, the hydraulic circuit can also be constructed as a closed circuit.

Advantageously, the pump can be switched between two delivery directions and fills a respective pressure space within the hydraulic cylinder according to the desired direction of travel of the piston rod. The switching of the direction of travel and thus the control of the hydraulic cylinder can occur by reversing the direction of turning when using a fixed displacement pump. For a variable displacement pump, control of the hydraulic cylinder can be done by adjusting the delivery device.

In event of a panic braking, the rapid adjustment of the hydraulic cylinder against the direction of travel can be triggered by a prestressed spring element.

Regardless of the choice of a closed or open circuit, for safety reasons a pressure limiting valve should be arranged between the pump and the control valve.

BRIEF DESCRIPTION OF THE DRAWINGS

For better comprehension, the invention will now be explained more closely by means of 8 drawings. These show.

DETAILED DESCRIPTION OF THE INVENTION

Figure 1:
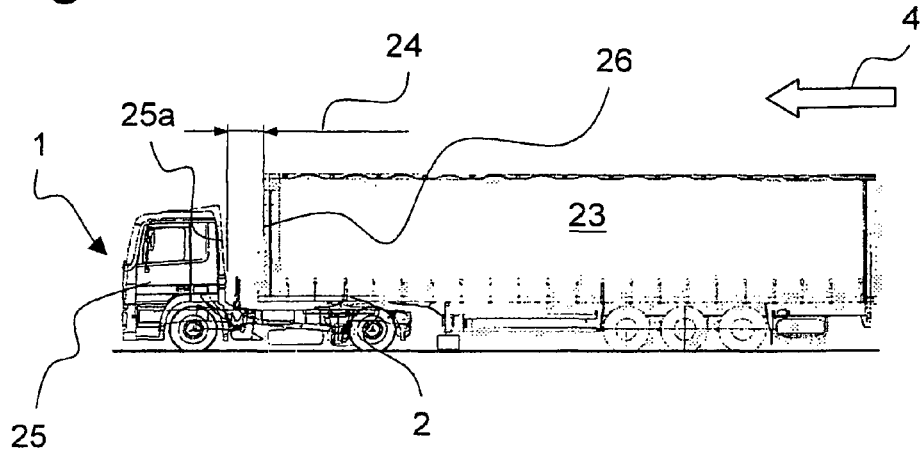
FIG. 1: a side view of a road train with maximum gap size between tractor vehicle and trailer during travel in a straight line.

FIG. 1 shows a side view of a conventional road train with a tractor 1 and a trailer 23 coupled onto it by means of a fifth wheel 2, moving in a straight line. The tractor 1 has a driver's cabin 25, whose rear wall 25a forms a gap 24 with a trailer front 26. In this depicted position of tractor 1 and trailer 23, the gap amounts to around 600 mm.

Figure 2:
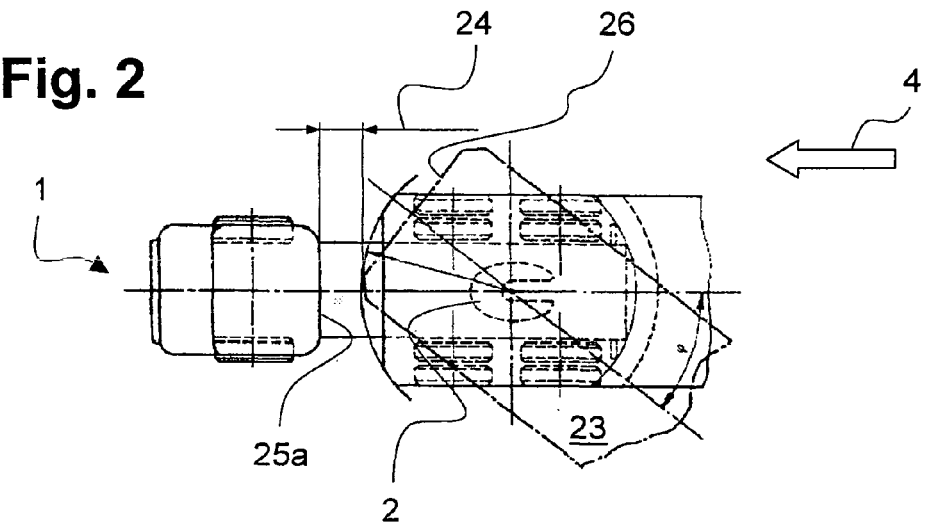
FIG. 2: a top view of a fifth wheel with maximum gap size between tractor and trailer when going round a curve.

The gap 24 is necessary so that a sufficient distance remains between the trailer front 26 and the driver cabin's rear wall 25a, even when the tractor 1 makes a turn, as can be seen in the magnified top view of FIG. 2. When the tractor 1 and trailer 23 are at an angle to each other, the gap 24 is reduced to around 250 mm.

Figure 3:
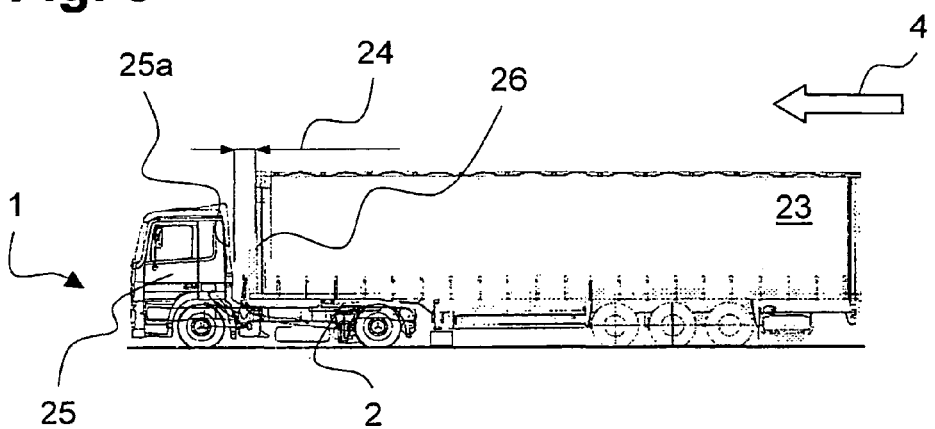
FIG. 3: a view per FIG. 1, with reduced gap size.

FIG. 3 shows the road train in a side view, moving in a straight line, where the gap 24 has been considerably reduced by displacing the fifth wheel 2 in the direction of travel 4. This is especially advisable when driving on the freeway, since the driving speed here is high and the anticipated reduction in air drag becomes especially noticeable. At the same time, only slight steering deflections of the tractor 1 occur when driving on the freeway.

Figure 4:
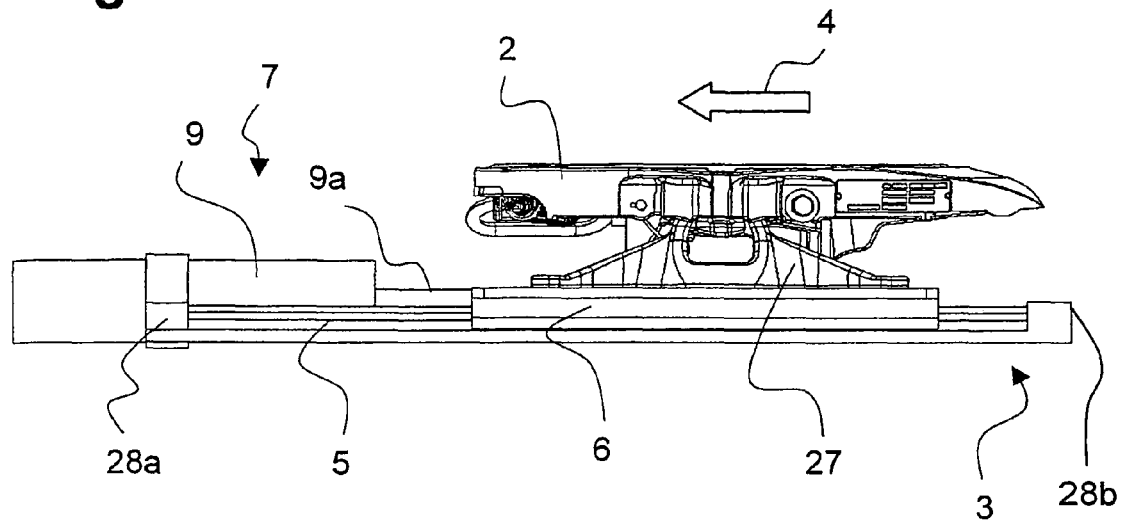
FIG. 4: a side view of a slider.

A reduction and possibly also an expansion of the gap 24 is possible by using the slider of the invention per FIG. 4. The fifth wheel 2 is fastened stationary on a slide 6 by means of two pillow blocks 27, only the front one being visible in the side view of FIG. 4. The slide 6 is guided on a substructure 3 and can move in and against the direction of travel 4. The substructure 3 is made up of two parallel guide rails 5 at a distance from each other, engaging with front and rear cross beams 28a, 28b at the ends. On the front cross beam 28a, a hydraulic cylinder 9 is fastened as motor-operated drive unit 7, with its piston rod 9a projecting to the rear and connected to the end of the slide 6. When the piston rod 9a travels, the slide 6 and thus also the fifth wheel 2 is moved laterally by the same amount.

Figure 5:
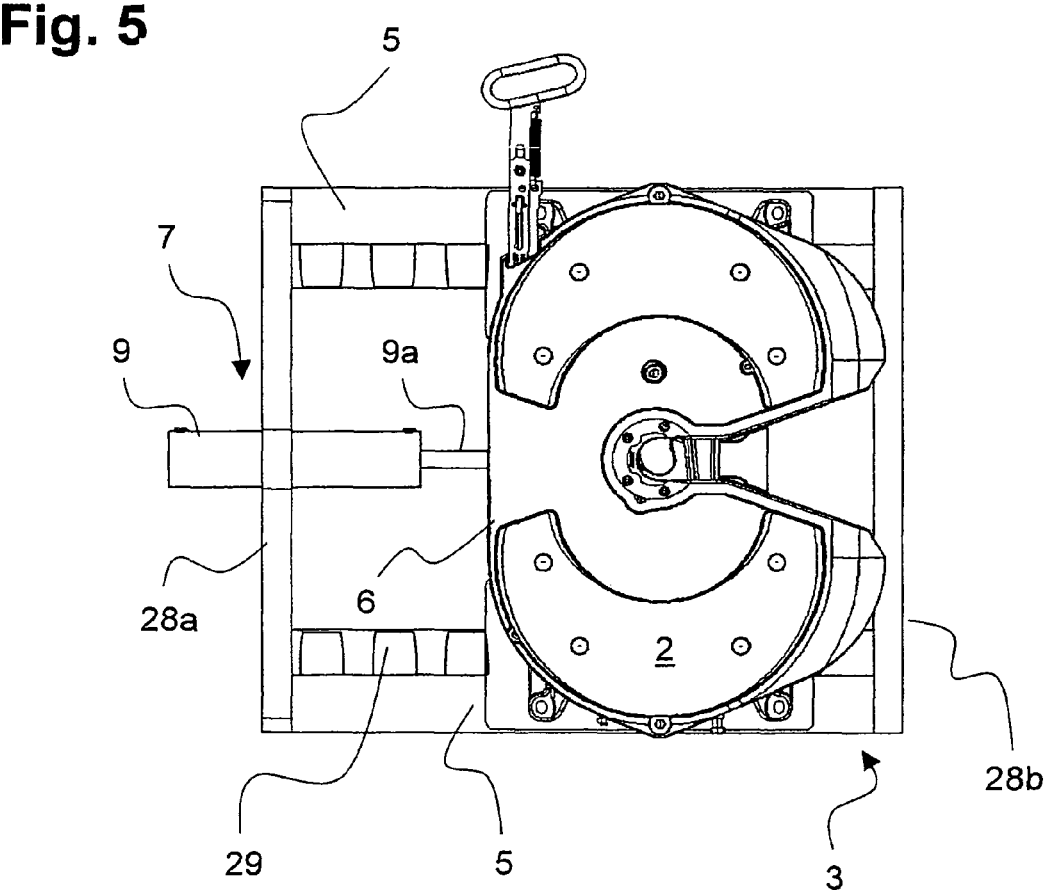
FIG. 5: a top view of a slider.

FIG. 5 shows a top view of the slider, where the arrangement of the hydraulic cylinder 9 on the boxlike substructure 3 is especially conspicuous. In order to relieve the strain on the hydraulic cylinder 9 during driving, locking means are present on the guide rails 5 and the slide 6, by which a removable positive connection can be produced between slide 6 and substructure 3. On the part of the guide rails 5, this is a toothing 29 which can be formed on the inner facing sides of the guide rails 5.

Figure 6:
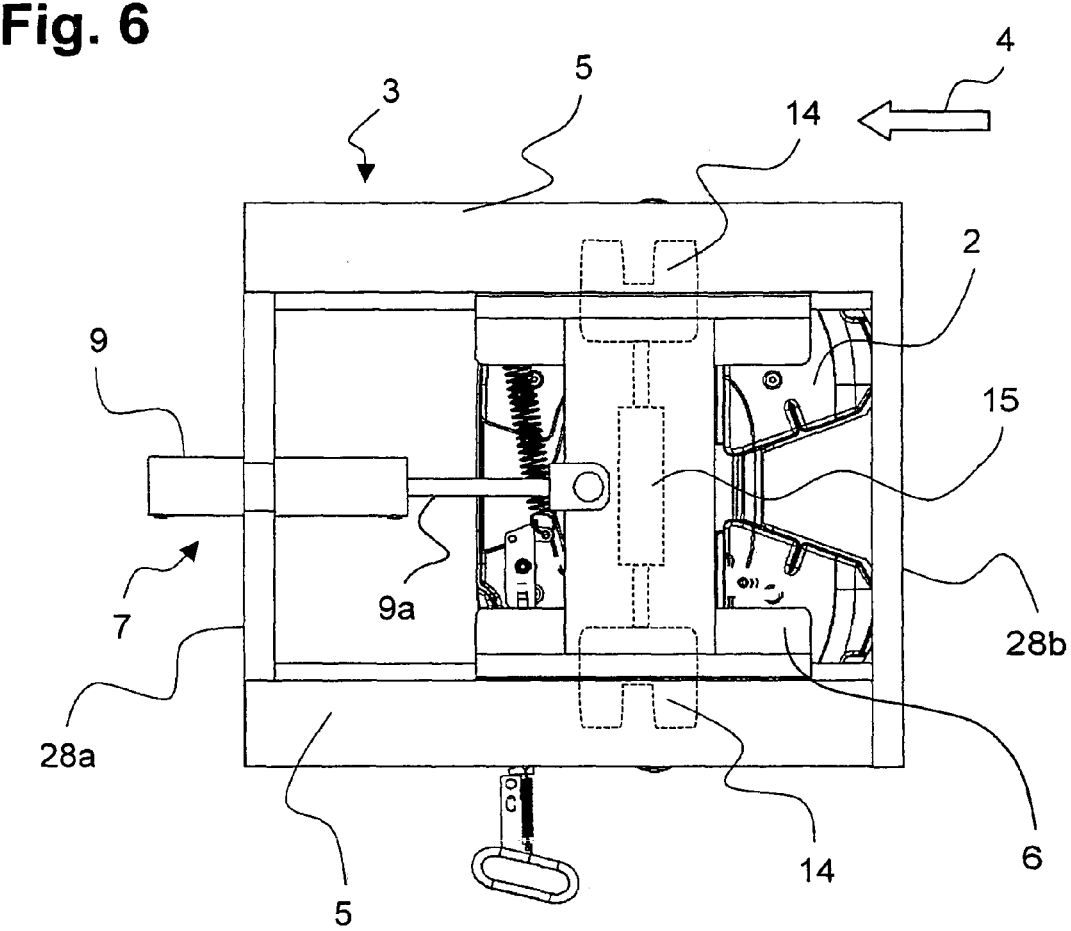
FIG. 6: a bottom view of a slider.

In the bottom view of FIG. 6, oppositely situated clamping shoes 14 are provided on the slide 6, which can engage synchronously with the toothing 29 for the positive locking of the slide 6, per FIG. 5. The locking and unlocking of the clamping shoes 14 is accomplished by an actuating element 15. The actuating element 15 is located between the pillow blocks 27 on the top side of the slide 6, underneath the fifth wheel 2.

Figure 7:
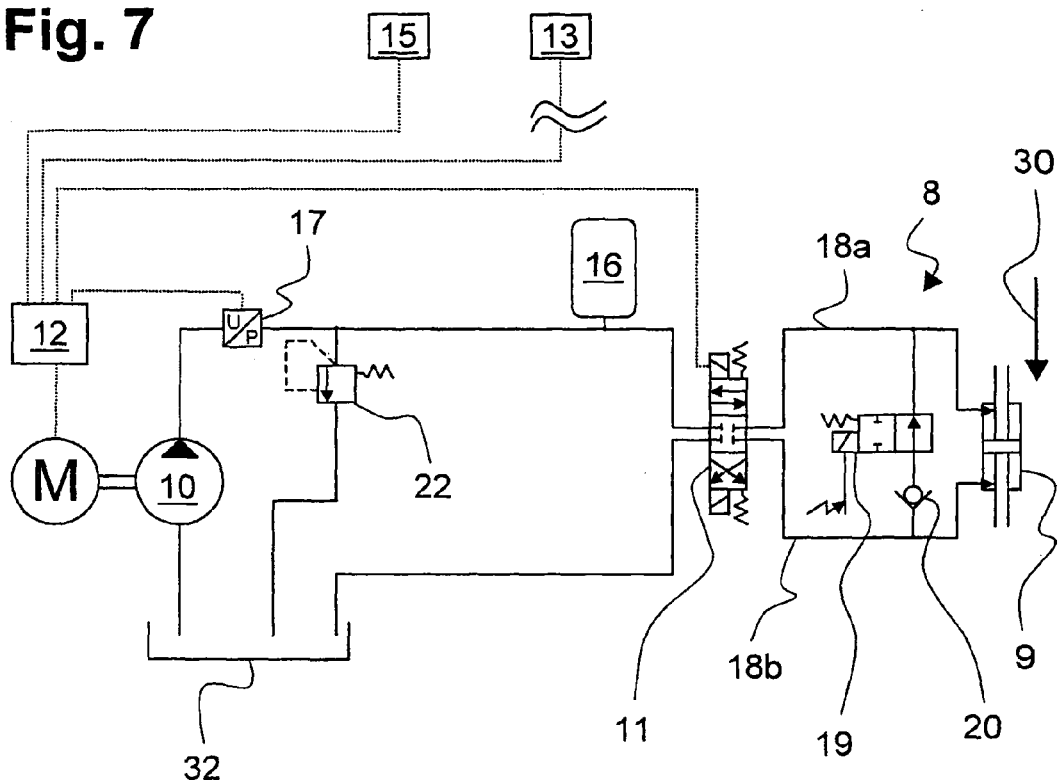
FIG. 7: a schematic circuit diagram of a slider with open hydraulic circuit.

The interacting of the individual components in an open hydraulic circuit 8 shall be explained by means of the schematic circuit diagram of FIG. 7. The hydraulic circuit 8 is designed to move the hydraulic cylinder 9 or its piston rod 9a (see FIGS. 4 to 8). An especially sudden movement of the slide 6 (see FIGS. 4 to 6) must be provided especially in the direction of the arrow 30 in event of a panic braking.

For this, a pump 10 is connected to the hydraulic cylinder 9 via a feed line 18a. A second drain line 18b goes from the hydraulic cylinder 9 to a return tank 32. Between the pump 10 and the hydraulic cylinder 9 there is a control valve 11, which is connected to the two lines 18a, 18b.

During driving operation, a pressure is built up by the pump 10 in the feed line 18a of the hydraulic cylinder 9. In order to make possible an especially fast movement of the piston rod 9a (see FIGS. 4 to 6) in the direction of travel 30, a pressure storage device 16 is arranged in the feed line 18a. In event of a panic braking, therefore, a sufficient pressure reservoir is at once available, so that the slight starting delay of the pump 10 can be bridged over and the slide 6 with the fifth wheel located on it is moved immediately.

After reaching or dropping below a predetermined pressure in the feed line 18a, a pressure switch 17 recognizes this condition and shuts off or turns on the pump 10.

During the driving of the road train, the switching position of the control valve 11 determines the path of travel of the hydraulic cylinder 9. For this, the control valve 11 is connected to a control device 12, which besides controlling the hydraulic circuit 8 also takes on the control of the actuating element 15. Inside the control device 12 there occurs a system-internal logical polling of the position of the fifth wheel 2 on the substructure 3 as a function of the speed of driving of the tractor 1. In event of a panic braking, the triggering signal is likewise generated in the control device 12. The existence of a panic braking is detected by connecting the control device 12 to a vehicle control device 13 or a so-called braking assist.

Downstream from the control valve 11, the feed line 18a is connected to the drain line 18b across a bypass line with a 2/2-way valve 19 and a check valve 20 blocking the flow in the direction of the drain line 18b. Thanks to this arrangement, the fifth wheel 2 with its slide 6 in event of a system failure is forced back in the direction of travel by external forces acting on the trailer 23, such as head wind and rolling resistance, so that after a short time driving of the road train a maximum gap 24 is produced between the tractor 1 and the trailer 23. In this load situation, the slide 6 may sometimes bump against the rear cross beam 28b (see FIGS. 4 to 6), so that this can be more heavily strained than the front cross beam 28b and should accordingly be secured firmly to the guide rails 5.

If the pressure becomes too high in the feed line 18a, it is vented by a pressure limiting valve 22 into the return tank 32.

Figure 8:
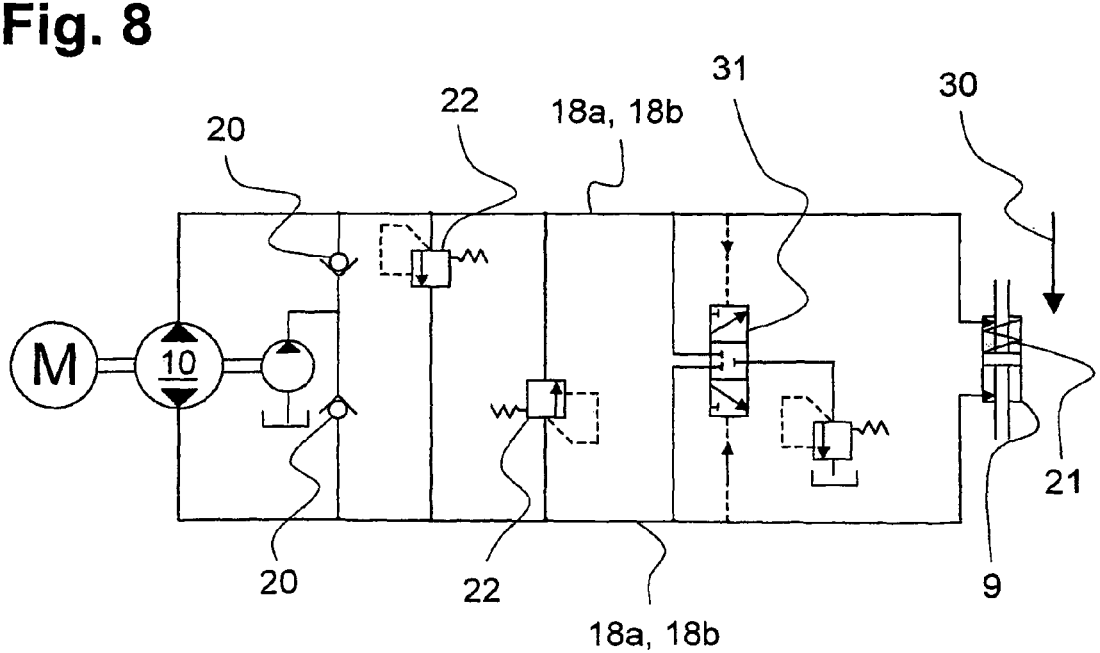
FIG. 8: a schematic circuit diagram of a slider with closed hydraulic circuit.

FIG. 8 shows an alternative embodiment of the slider with a closed hydraulic circuit 8, which uses a pump 10 that can be switched in its delivery direction. The delivery direction corresponds to the desired direction of travel of the hydraulic cylinder 9, so that the feed and drain lines 18a, 18b are accordingly pressurized alternatingly in dependence on the direction of travel of the hydraulic cylinder. The two lines 18a, 18b are provided with pressure limiting valves 22 against each other. In event of a necessary rapid panic braking, an accelerated backward movement in the direction of travel 30 is triggered by a prestressed spring element 21, which engages with the hydraulic cylinder 9 or directly with the slide 6.

If the pressure is too high in the feed or drain line 18a, 18b, working as an intake line, this will be vented by a pressure-operated 3/3-way valve 31.

LIST OF REFERENCE NUMBERS 1 tractor vehicle
2 fifth wheel
3 substructure
4 direction of travel
5 guide rails
6 slide
7 motor-driven drive unit
8 hydraulic circuit
9 hydraulic cylinder
9a piston rod
10 pump
11 control valve
12 control device
13 vehicle control device
14 clamping shoes
15 actuating element
16 pressure storage device, bladder accumulator
17 pressure switch
18a feed line of hydraulic cylinder
18b drain line of hydraulic cylinder
19 2/2-way valve
20 check valve
21 spring element
22 pressure limiting valve
23 trailer
24 size of tractor/trailer gap
25 driver's cabin
25a rear wall of driver's cabin
26 front of trailer
27 pillow block
28a front cross beam
28b rear cross beam
29 guide rail toothing
30 panic braking direction of travel
31 pressure-activated 3/3-way valve
32 return tank

What is claimed is:
1. A slider for a fifth wheel arranged on a tractor vehicle, comprising:
 a substructure with at least two guide rails oriented in a direction of travel, the substructure connected to the tractor vehicle,
 a displaceable slide which carries the fifth wheel and engages with the guide rails such that the slide carrying the fifth wheel is arranged on the tractor vehicle, and clamping shoes arranged oppositely on the slide, making possible a positive locking of the slide in the guide rails, as well as an actuating element, which moves the clamping shoes into a released position and a locking position, a motor-driven drive unit, with a hydraulic cylinder connected to a hydraulic circuit and a control valve, connected to an electronic control device, which controls the travel of the hydraulic cylinder, and wherein the electronic control device beside controlling the hydraulic circuit also takes on the control of the actuating element for activating said hydraulic cylinder and said actuating element without interaction of a driver during a driving situation.

2. The device per claim 1, wherein the hydraulic circuit includes a pump.

3. The device per claim 1, wherein the hydraulic cylinder engages by a first end with the slide and can be placed by an other end of the hydraulic cylinder on a stationary component of the tractor vehicle.

4. The device per claim 3, wherein the stationary component is formed by the substructure.

5. The device per claim 1, wherein the hydraulic cylinder is of a dual-acting type.

6. The device per claim 5, wherein the dual-acting hydraulic cylinder is a constant running cylinder or a differential cylinder or a combination thereof.

7. The device per claim 1, wherein the hydraulic circuit includes a control valve, which controls the travel of the hydraulic cylinder.

8. The device per claim 7, wherein the control valve is connected to the electronic control device.

9. The device per claim 8, wherein the electronic control device can be connected to a vehicle control device.

10. The device per claim 1, wherein the slide is positively fixed to the guide rails in a near steady operating condition by the clamping shoes arranged on the slide.

11. The device per claim 10, wherein the actuating element is arranged on the slide, which moves the clamping shoes into a release position and a locking position.

12. The device per claim 11, wherein the actuating element is a pneumatic cylinder.

13. The device per claim 12, wherein the pneumatic cylinder can be connected to a pressurized air supply of the tractor vehicle.

14. The device per claim 1, wherein the hydraulic circuit is constructed as an open circuit.

15. The device per claim 14, wherein a pressure storage device is arranged between the pump and the control valve in the open hydraulic circuit.

16. The device per claim 14, wherein the control valve is a 4/3-way valve.

17. The device per claim 14, wherein a pressure switch is arranged between the pump and the control valve.

18. The device per claim 17, wherein the pressure switch controls the operation of the pump.

19. The device per claim 14, wherein a 2/2-way valve with check valve is arranged downstream from the control valve between a feed and drain line of the hydraulic cylinder.

20. The device per claim 1, wherein the hydraulic circuit is constructed as a closed circuit.

21. The device per claim 20, wherein the pump can be switched between two delivery directions.

22. The device per claim 20, wherein the pump is a fixed displacement pump and the control of the hydraulic cylinder occurs by reversing the direction of turning.

23. The device per claim 20, wherein the pump is a variable displacement pump, and control of the hydraulic cylinder is done by adjusting a delivery device.

24. The device per claim 20, wherein a stroke of the hydraulic cylinder against the direction of travel is triggered by a prestressed spring element, for rapid adjustment.

25. The device per claim 20, wherein a pressure limiting valve is arranged between the pump and the control valve.

26. The device per claim 15, wherein the pressure storage device is a bladder accumulator.

27. A slider for a fifth wheel arranged on a tractor vehicle, comprising:

a substructure with at least two guide rails oriented in a direction of travel, the substructure connected to the tractor vehicle, a displaceable slide which carries the fifth wheel and engages with the guide rails such that the slide carrying the fifth wheel is arranged on the tractor vehicle, and clamping shoes arranged oppositely on the slide, making possible a positive locking of the slide in the guide rails, as well as an actuating element, which moves the clamping shoes into a released position and a locking position, a motor-driven drive unit, with a hydraulic cylinder connected to a hydraulic circuit and a control valve, connected to a control device, which controls the travel of the hydraulic cylinder, wherein the control device beside controlling the hydraulic circuit also takes on the control of the actuating element without interaction of a driver during a driving situation, and wherein inside the control device there occurs a system-internal logical polling of a position of the fifth wheel on the substructure as a function of a speed of driving of the tractor during the driving situation.

28. The device per claim 27, wherein the slide is positively fixed to the guide rails in a near steady operating condition by the clamping shoes arranged on the slide, and wherein the actuating element is arranged on the slide, which moves the clamping shoes into a release position and a locking position.

29. The device per claim 27, wherein the hydraulic circuit is constructed as an open circuit and a pressure switch is arranged between the pump and the control valve, and wherein the pressure switch controls the operation of the pump.

30. The device per claim 27, wherein the hydraulic circuit is constructed as an open circuit and a storage device is arranged between the pump and the control valve.

31. The device per claim 27, wherein the hydraulic circuit is constructed as a closed circuit, wherein the pump can be switched between two delivery directions, and wherein the pump is a fixed displacement pump and the control of the hydraulic cylinder occurs by reversing the direction of turning.

32. The device per claim 27, wherein the hydraulic circuit is constructed as a closed circuit and the pump can be switched between two delivery directions, wherein the pump is a variable displacement pump, and control of the hydraulic cylinder is done by adjusting a delivery device.

33. The device per claim 27, wherein a stroke of the hydraulic cylinder against the direction of travel is triggered by a pre-stressed spring element, for rapid adjustment.

34. A slider for fifth wheel arranged on a tractor vehicle, comprising:

a substructure with at least two guide rails oriented in a direction of travel, the substructure connected to the tractor vehicle, a displaceable slide which carries the fifth wheel and engages with the guide rails such that the slide carrying fifth wheel is arranged on the tractor vehicle, and clamping shoes arranged oppositely on the slide, making possible a positive locking of the slide in the guide rails, as well as an actuating element, which moves the clamping shoes into a released position and a locking position, a motor-driven drive unit, with a hydraulic cylinder connected to a hydraulic circuit and a control valve, connected to a control device, which controls the travel of the hydraulic cylinder, wherein the control device beside controlling the hydraulic circuit also takes on the control of the actuating element without interaction of a driver during a driving situation, and wherein existence of a panic breaking is detected automatically by connecting the control device to a vehicle control device or a braking assistant.

35. The device per claim 34, wherein the slide is positively fixed to the guide rails in a near steady operating condition by the clamping shoes arranged on the slide, and wherein the actuating element is arranged on the slide, which moves the clamping shoes into a release position and a locking position.

36. The device per claim 34, wherein the hydraulic circuit is constructed as an open circuit and a pressure switch is arranged between the pump and the control valve, and wherein the pressure switch controls the operation of the pump.

37. The device per claim 34, wherein the hydraulic circuit is constructed as an open circuit and a storage device is arranged between the pump and the control valve.

38. The device per claim 34, wherein the hydraulic circuit is constructed as a closed circuit, wherein the pump can be switched between two delivery directions, and wherein the pump is a fixed displacement pump and the control of the hydraulic cylinder occurs by reversing the direction of turning.

39. The device per claim 34, wherein the hydraulic circuit is constructed as a closed circuit and the pump can be switched between two delivery directions, wherein the pump is a variable displacement pump, and control of the hydraulic cylinder is done by adjusting a delivery device.

40. The device per claim 34, wherein a stroke of the hydraulic cylinder against the direction of travel is triggered by a pre-stressed spring element, for rapid adjustment.

* * * * *